US008707542B2

(12) United States Patent
Dirks et al.

(10) Patent No.: US 8,707,542 B2

(45) Date of Patent: Apr. 29, 2014

(54) ROTARY FOAM INSULATION CUTTER

(75) Inventors: Jay Dean Dirks, Potlatch, ID (US); Preston Wayne Schmidt, Moscow, ID (US)

(73) Assignee: Schmidt & Dirks Designs, Inc., Potlatch, ID (US)

( * ) Notice: Subject to any disclaimer, the term of this patent is extended or adjusted under 35 U.S.C. 154(b) by 687 days.

(21) Appl. No.: 13/006,841

(22) Filed: Jan. 14, 2011

(65) Prior Publication Data

US 2011/0167648 A1 Jul. 14, 2011

Related U.S. Application Data

(60) Provisional application No. 61/335,909, filed on Jan. 14, 2010.

(51) Int. Cl.

*B23P 23/02* (2006.01)
*B23D 57/02* (2006.01)
*B27B 17/04* (2006.01)
*B27B 17/00* (2006.01)
*B23C 1/20* (2006.01)
*B27C 1/10* (2006.01)

(52) U.S. Cl.

USPC .................. 29/560; 30/122; 30/123; 30/381; 30/383; 30/475; 29/33 A; 144/131; 144/154.5; 409/139; 409/175

(58) Field of Classification Search

USPC ............. 29/560, 50, 33 A; 30/475, 122, 123, 30/381, 383; 409/175, 181, 182, 139–140; 144/154.5, 136.95, 115, 117.1, 131

See application file for complete search history.

(56) References Cited

U.S. PATENT DOCUMENTS 1,775,430 A * 9/1930 Hibbs ............................ 30/477
2,437,669 A * 3/1948 Adams ............................ 30/347

(Continued)

OTHER PUBLICATIONS

Krendl Machine Company; Krendl Wall Scrubber; Helphos, Ohio; Apr. 2009 (www.krendlmachine.com).

(Continued)

*Primary Examiner* — Erica E Cadugan

(74) *Attorney, Agent, or Firm* — Patent Law & Venture Group; Gene Scott

(57) ABSTRACT

A power tool for trimming soft materials has a power driver with a drive train engaged with a cylindrical cutter body wherein the power driver rotates the cutter body about its longitudinal axis. A plurality of mutually spaced apart cutter teeth are fixed to an exterior surface of the cutter body. The cutter teeth each have a top surface and a sidewall surface, the sidewall surface extensive between the top surface and an exterior surface of the cutter body. The top surface of each of the cutter teeth is a four-sided convex polygon and the sidewall surface includes four mutually discrete surfaces corresponding to the sides of the polygon, with each of said discrete surfaces extending between the top surface and the cutter body.

8 Claims, 5 Drawing Sheets

(56) References Cited

U.S. PATENT DOCUMENTS

| | | | | | |
|---|---|---|---|---|---|
| 3,286,348 | A * | 11/1966 | Kunst | 30/289 |
| 4,479,303 | A * | 10/1984 | Gardner | 30/383 |
| 4,506,444 | A * | 3/1985 | Sundstrom | 30/122 |
| 4,674,185 | A * | 6/1987 | Gardner | 30/122 |
| 4,948,307 | A * | 8/1990 | Dodds | 409/136 |
| 4,985,997 | A * | 1/1991 | Gross, Sr. | 30/122 |
| 5,626,444 | A * | 5/1997 | Campian | 407/54 |
| 5,878,800 | A * | 3/1999 | Young | 30/372 |
| 6,354,009 | B1 * | 3/2002 | Belleau | 30/475 |
| 7,454,821 | B2 * | 11/2008 | Cooper et al. | 29/33 R |
| 2005/0188484 | A1 * | 9/2005 | Lytle | 15/52.1 |

OTHER PUBLICATIONS

Spray Foam Equipment; Da Sha-Ver Machine; Kansas City, MO 64123; Jan. 2011 (http://www.sprayfoamequipment.com/dashaver.html).

All Phase Fabrication; Quickplane; Allendale, MI; Jan. 2011 (http://www.quickplane.com).

* cited by examiner

ROTARY FOAM INSULATION CUTTER

CROSS-REFERENCE TO RELATED APPLICATIONS

This application is a non-provisional application describing the same invention as an active provisional application, Ser. No. 61/335,909, filed on Jan. 14, 2010. Being filed within one year of said provisional application, this application claims date priority therefrom. Said provisional application is hereby incorporated herein by reference in its entirety.

BACKGROUND

The present disclosure relates to the field of power tools used for interior finishing applications in new or modified building construction, and especially to the process of finishing expansive foam insulation installed in vertical walls. A typical wall construction includes a first and a second wall material such as wall-board or gypsum-board installed on opposite sides of vertical studs. After the first wall is mounted on one side of the studs, the foam insulation is painted on the interior surface of the first wall and allowed to expand. The insulation expands away from the first wall and beyond where the second wall is intended to be positioned. This is necessary to insure that no void is left within the wall when the second wall is mounted on the studs. It is necessary to shave, cut, plane or dress the protruding surface of the insulation material so that it is very nearly even (coplanar) with the open stud faces that will receive the second wall. Typically, some of the expanded foam will coat the open stud faces as well and this overflow insulation must be removed so that the second wall can sit flush on the studs. Tools designed for trimming the insulation are in common use and may be used for other applications where the dressing of soft materials is called for. Tools currently in use specifically for trimming expanding foam insulation are manufactured by Spray Foam Equipment, an Internet company, by APF, LLC of Allendale, Mich., and by Krendal Machine Company of Delphos, Ohio.

SUMMARY

The presently described apparatus is used for trimming or shaping a foam insulation material by a rapid scraping or cutting action. A set of cylindrical cutters are mounted on a common driven axle. A sprocket is mounted at the center of the axle and engaged with a the chain of a chain saw. Therefore, the chain saw is able to rotate the cylindrical cutters. The cutters are metal cylinders which are milled down to a nominal exterior surface leaving radially oriented cutting teeth protruding.

In one aspect of the apparatus, the teeth are arranged on the exterior surface of the cylinder in a spiral alignment with the spiral angle being about 45° relative to the rotational axis defined by the axle.

In another aspect of the apparatus the top surfaces of the teeth are four sided symmetrical polygons with diagonals aligned with the axle and transverse thereto.

In another aspect of the apparatus, sidewalls of each of the teeth are planes extending between the four edges of the top surface and the exterior surface and preferably making an approximate right angle with the top surface, such angle forming the cutting edges of the teeth.

In another aspect of the apparatus the cylinder may be applied to any type of driver such as an electric motor.

In another aspect of the apparatus the chain saw blades are positioned to cut into a work piece so that no uncut work piece margin is left after a cutting operation.

These and other aspects may, in various implementations, provide one or more of the following advantages.

The machine/process described provides the advantage of portability, ease of use, effective cutting of an expansive foam material that protrudes outwardly beyond the mounting faces of two adjacent building studs and cleans the faces of the studs simultaneously and does not produce an undesirable dust.

The details of one or more embodiments of these concepts are set forth in the accompanying drawings and the description below. Other features, objects, and advantages of these concepts will be apparent from the description and drawings, and from the claims.

DESCRIPTION OF DRAWINGS

Like reference symbols in the various drawings indicate like elements.

DETAILED DESCRIPTION

Figure 1:
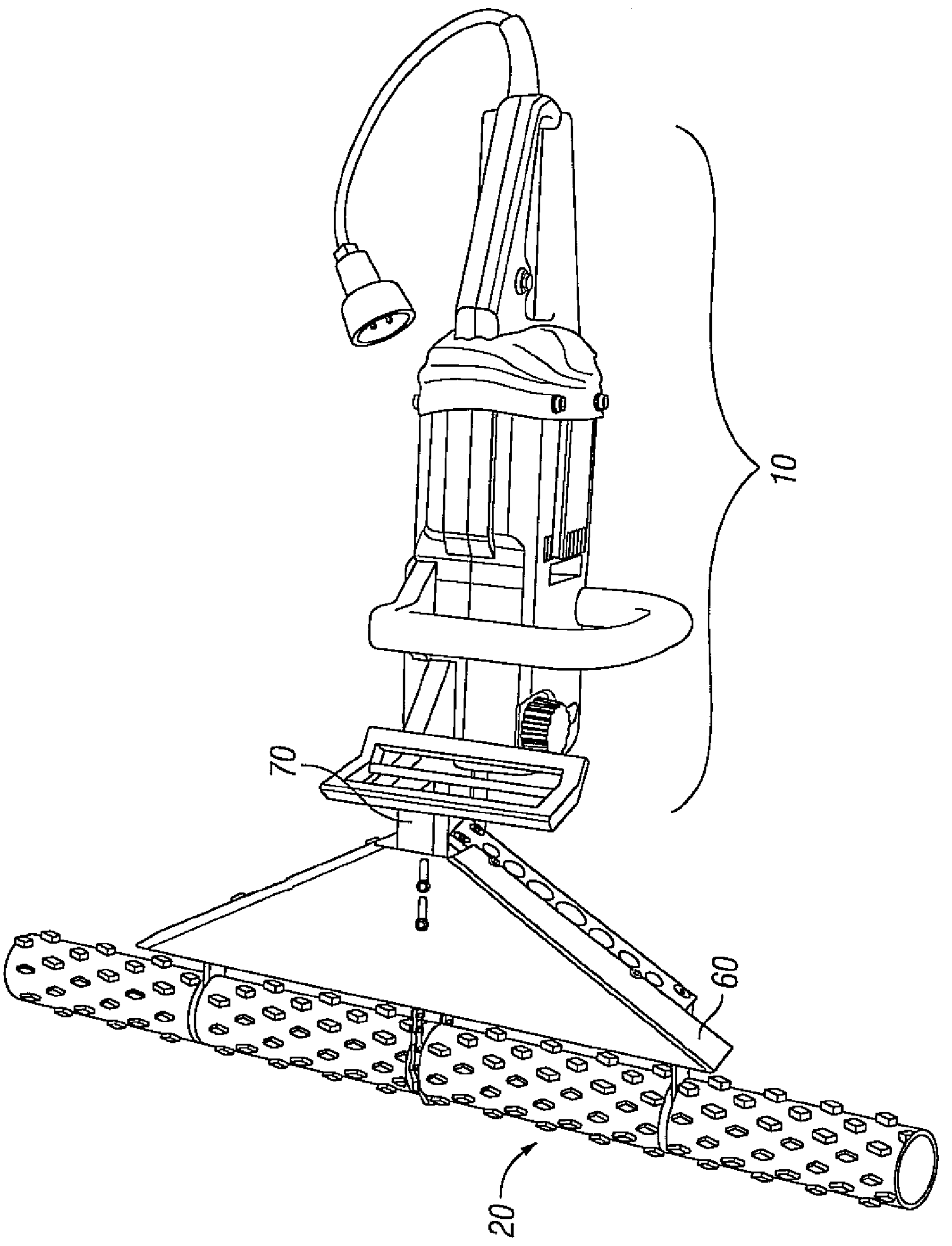
FIG. 1 is top perspective view of an example of the apparatus described herein.
Figure 2:
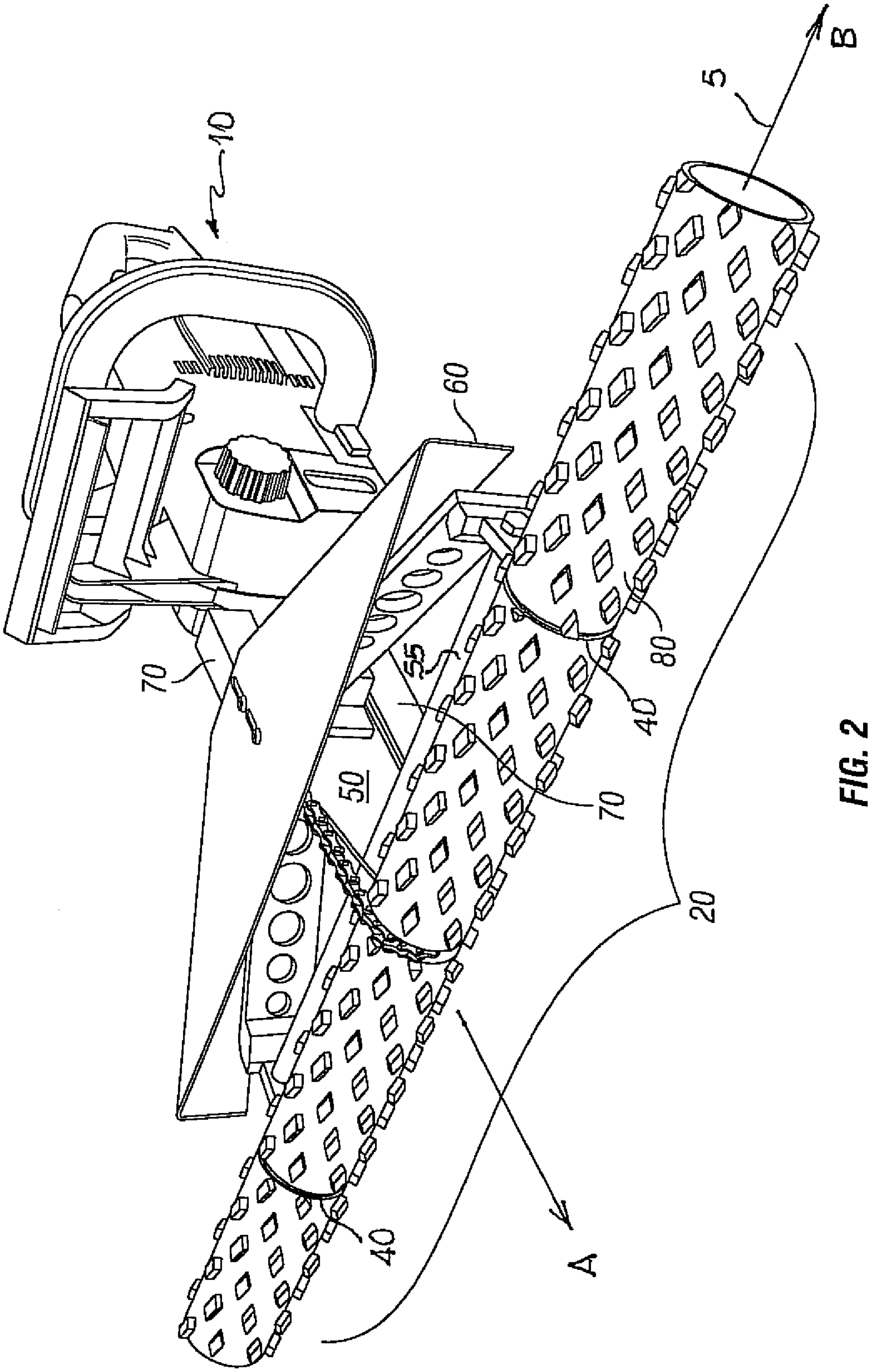
FIG. 2 is a further perspective view thereof.
Figure 3:
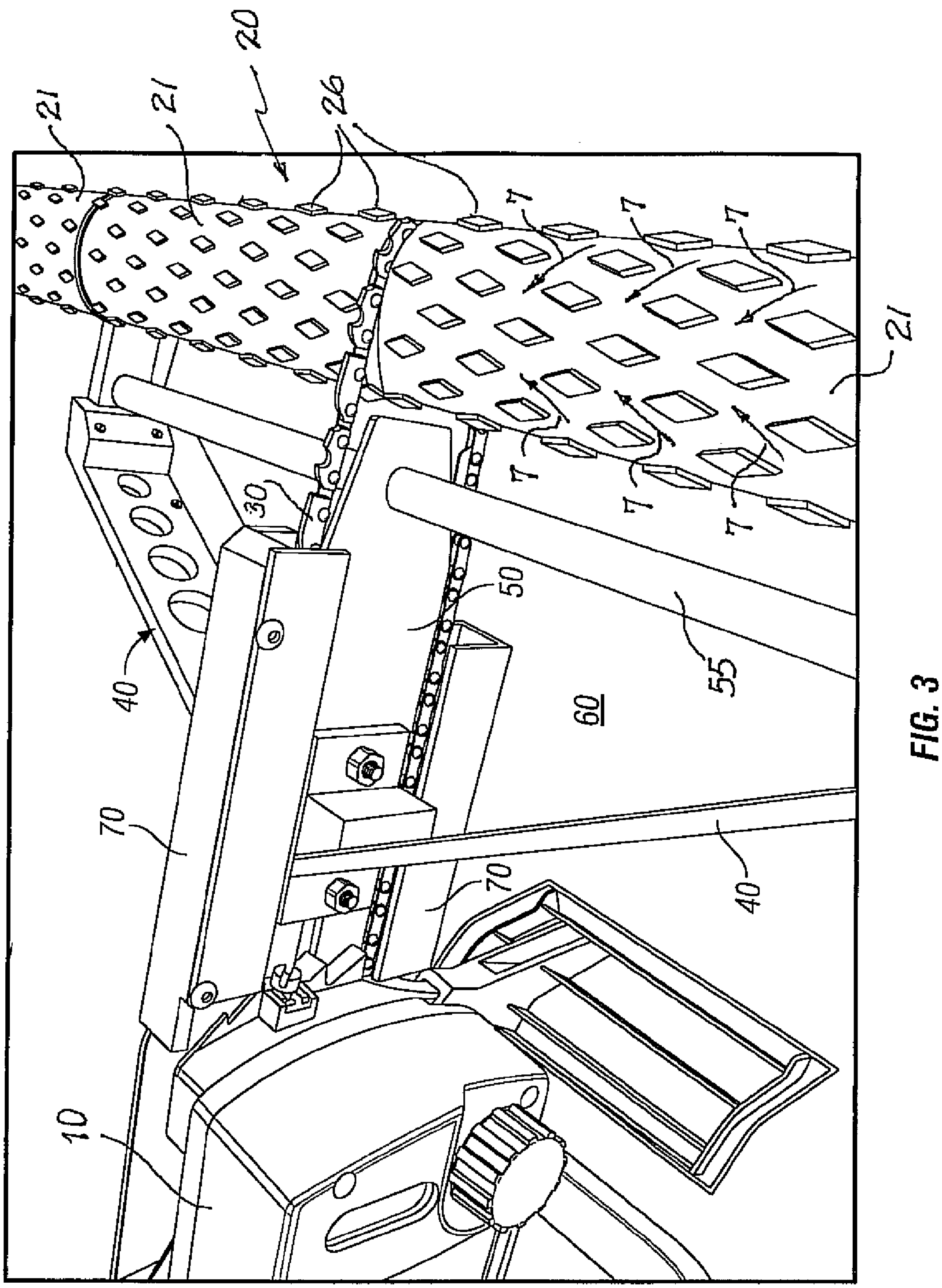
FIG. 3 is a bottom perspective view thereof showing key details thereof.

FIG. 1 illustrates the presently described apparatus in an example wherein a power tool 10 drives a cylindrical cutter 20 in rotation as will be described below. The apparatus is used for trimming a foam insulation work piece (not shown) and is particularly well suited for cutting such soft materials with high efficiency and without creating a dust. The power tool 10 may be a common chain saw, as shown in FIGS. 1, 2 and 3, such as those manufactured by Husqvama Norge AS of Sarpsborg, Norway, or other manufacturer. The power tool 10 may be other than a chain saw but the use of a chain saw has certain benefits as will be described.

In this example, the power tool 10 may have its chain guide bar 50 shortened as shown in FIG. 3, and may use an extra-long saw chain 30 if necessary. The chain guide bar 50 may extend in a first direction depicted by arrow A in FIG. 2, while a rotational axis 5 of the cutter 20 is oriented in a second direction B, orthogonal to direction A. Therefore, forward pressure in the direction of arrow A may be applied to the cutter 20 resulting in a uniform force along its entire length and against a work piece. The chain 30 may be covered by lengths 70 of channel stock as shown, primarily for operator protection. Cover 60 may be made of sheet metal and secured in place on the power tool 10 for catching cuttings during operation so that the cuttings do not fly into the operator's face and do not obscure the operator's view of the work piece. To accomplish this cover 60 is wide enough to span about 60% of the length of cutter 20 and has a V-shape to maximize operator visibility of the work piece and its surroundings during operation. Stabilizer bar 55 extends between the left and right brace and bearing holders 40 and mechanically engages chain guide bar 50 providing improved rigidity to the apparatus in that it too forms a structural triangle with the brace and bearing holders 40 as well as acquiring additional structural support by engaging the guide bar 50.

Figure 5:
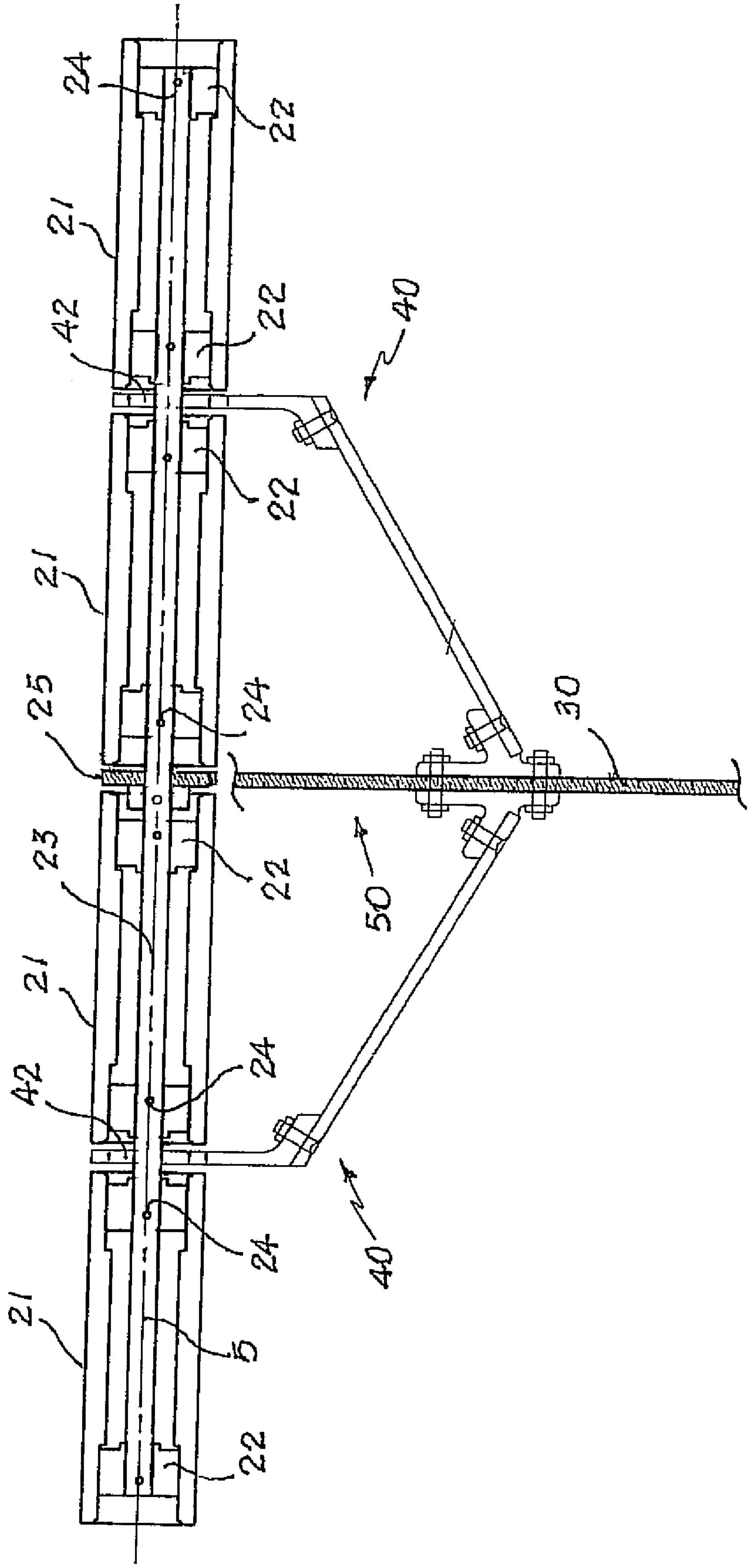
FIG. 5 is a plan view schematic diagram of a front end thereof.

In FIG. 2, we see that cutter 20 may comprise two or more separate cutter portions 21. The cutter portions 21 may be right-regular hollow cylinders with an exterior surface 80 of a uniform diameter. In one embodiment of the apparatus, best shown in FIG. 5, bushings 22 may be tight fitted within portions 21 at opposing ends thereof, and portions 21 may then be slid onto drive shaft 23 and secured in place using pins 24 which are anchored through drive shaft 23. FIG. 5 also shows that a sprocket 25 may be mounted on drive shaft 23 at its center and as shown in FIG. 3 saw chain 30 engages sprocket 25. As the chain 30 is driven, so the cutter 20 revolves. As best seen in FIG. 3 and in an overview in FIG. 5, brace and bearing holders 40 are mounted between guide bar 50 and cutter 20 with bearing sets 42 engaged with drive shaft 23 to provide secure mounting and stability to the cutter 20. The triangular arrangement of the drive shaft 23 with the two brace and bearing holders 40 offers a highly rigid structure which resists movement of cutter 20 along the direction shown by arrow A.

Figure 4:
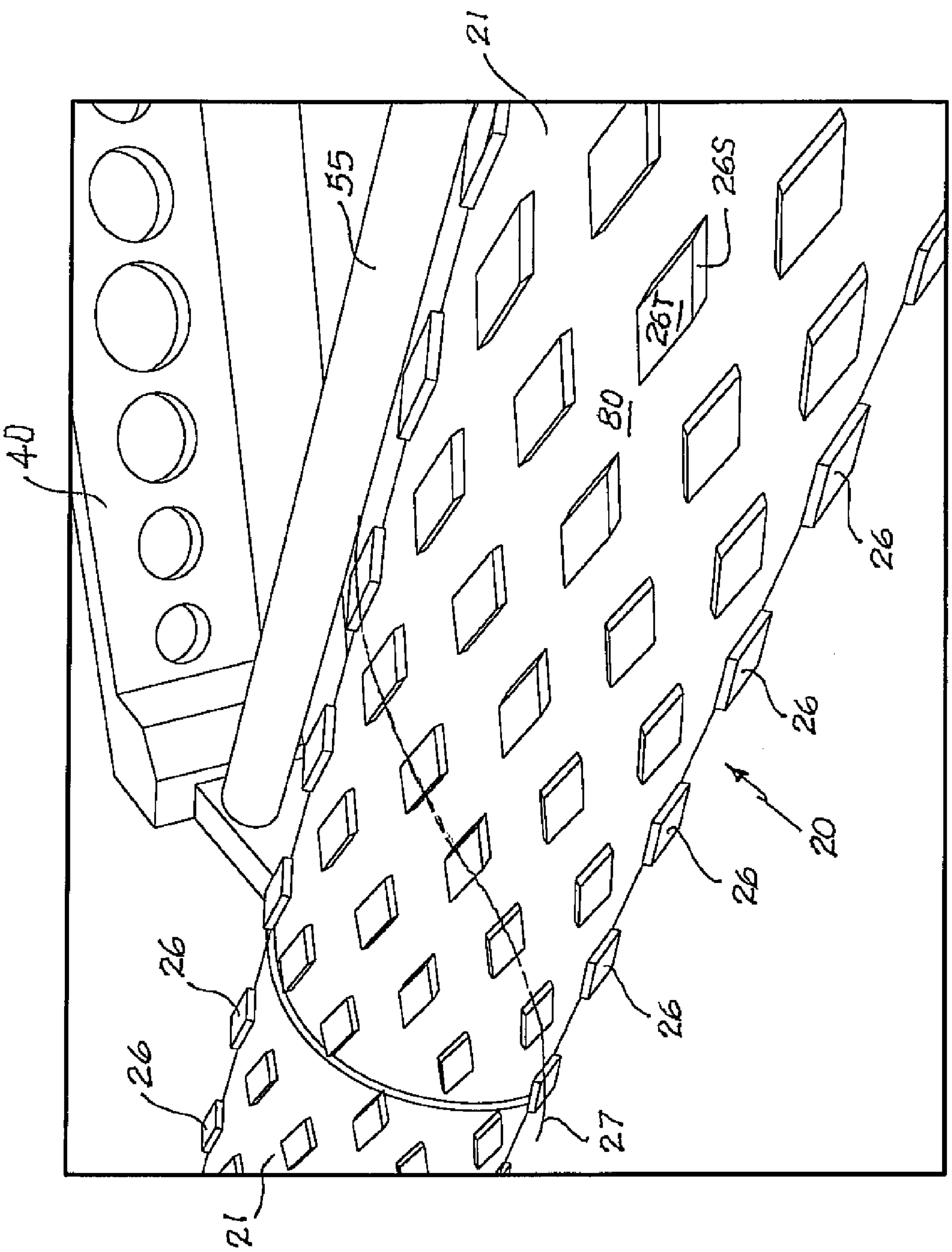
FIG. 4 is a further bottom perspective view thereof with particular attention to a cylindrical cutter thereof.

FIG. 4 shows that a plurality of mutually spaced apart cutter teeth 26 may be fixed in a uniform pattern on the exterior surface 80 of cutter 20 so that as it rotates the teeth 26 move in circular action against the work piece, cutting into it and thereby reducing it. The cutter teeth 26 each have a top surface 26T and sidewall surface 26S which is extensive between the top surface 26T and the exterior surface 80. The top surface 26T of each of the teeth 26 may be a four-sided polygon and the sidewall surface 26S may then include four mutually discrete surfaces corresponding to the sides of the polygon, with each of the sidewall surfaces extending between the top surface 26T and the exterior surface 80. Each of the teeth 26 may be between 3/16 and 5/16 inches in height and may be 1 3/16 inches in length as, in trials, has been shown to be an optimal arrangement although other arrangements may be possible and may vary depending upon the nature and hardness of the work piece. The plurality of teeth 26 may be arranged in spiral formations along spiral lines 27, one typical example of which is shown in FIG. 4. As stated, teeth 26 extend radially away from surface 80. The top surfaces 26T of teeth 26 correspond with a hypothetical cylindrical surface coaxial with surface 80 and this means that the top surfaces 26T are convex segments of a cylindrical circular surface. This enables the teeth 26 to rotate against a relatively hard surface, such as that of a wooden wall stud without cutting into it and shredding it. Also all of the teeth 26 are positioned at the same radius relative to axis 5 which allows the teeth 26 to cut into a soft material such as the foam insulation material previously mentioned without undue chatter or vibration. The sidewall surfaces 26S may be planar and set at an angle of about 45° with respect to the tooth's direction of motion, which enables material that is cut away from the work piece to slide off the surfaces 26S efficiently entering channels 7 between the spiral alignments of the teeth 26 as shown in FIG. 3. As the cut portions of the work piece move into channels 7 by momentum due to the cutting action, they are struck by the top edge of the next tooth 26 which is laterally positioned and thereby projected away from cutter 20. The top surface 26T and side surface 26S are at a near right angle ±10° with respect to each other. So that this edge cuts into a soft material when cutter 20 is pressed into wherein the soft material tends to fill the channels 7.

As shown in FIG. 1, the cylindrical cutter 20 may have two collinear spaced apart portions 21 separated by the drive sprocket 25 and chain 30. As also shown in FIG. 1, the cylindrical cutter 20 may have four collinear spaced apart portions 21 where two of the portions 21 are separated by the bearing sets 42 on each side of the drive sprocket 25.

In use, the cutter cylinders of the chainsaw driven version of the present innovative apparatus are held against the work piece and moved in a vertical manner over the surface of the work piece. The cylinders are long enough to span the space between adjacent studs so that with the ends of the cylinders resting on the stud faces, the cutters are exactly positioned for producing a final surface of the work piece that will contact the interior surface of a wall panel attached to the stud faces thereby leaving no interior space within the wall.

It should be realized that the cutter cylinders 21 described herein may be used with a wide range of equipment with only the single requirement that the cylinders 21 be mounted for rotation. Therefore, the individual cylinders 21, sets of the cylinders 21 and the cylinders 21 mounted for operation with any driver are all aspects of the present described apparatus and each should be considered on its own merits as a novel and non-obvious enablement of the present innovation.

A number of embodiments have been described. Nevertheless, it will be understood that various modifications may be made without departing from the spirit and scope of this disclosure. Accordingly, other embodiments are within the scope of the following claims.

What is claimed is:

1. A rotary cutting tool for trimming the surface of a work piece, the tool comprising:

a chain saw having a chain guide bar with a first longitudinal axis extending in a first direction;

a cylindrical cutter mounted to the chain saw and positioned such that a second longitudinal axis of the cylindrical cutter extends in a second direction orthogonal to the first direction, the cylindrical cutter rotatable about the second longitudinal axis;

a saw chain of the chain saw engaged with a sprocket that is rotatable relative to the chain saw about the second longitudinal axis such that the chain saw, the saw chain, and the sprocket are used for causing the rotation of the cylindrical cutter;

a plurality of mutually spaced apart cutter teeth fixed in a uniform pattern on an exterior surface of the cylindrical cutter;

wherein the cylindrical cutter has a plurality of portions that are secured to a common drive shaft that is rotatable about the second longitudinal axis, wherein two of the portions are separated by the sprocket, and wherein on opposing sides of the sprocket along the second direction, two of the portions are separated by a respective brace and bearing holder for supporting the common drive shaft;

whereby, the saw chain operatively rotates the cylindrical cutter thereby moving the cutter teeth in cutting action against the work piece.

2. The cutting tool of claim 1 wherein the cutter teeth each have a top surface and a sidewall surface, each sidewall surface extending between the respective top surface and the respective exterior surface.

3. The cutting tool of claim 2 wherein the top surface of each of said teeth is a polygon and the respective sidewall surface includes mutually discrete surfaces corresponding to sides of the top surface.

4. The cutting tool of claim 2 wherein the top surfaces of the teeth correspond with a cylindrical surface.

5. The cutting tool of claim 2 wherein the sidewall surfaces form an approximate 45° angle with the direction of rotation of the teeth when the cylindrical cutter is rotated about the second longitudinal axis.

6. The cutting tool of claim 1 wherein the plurality of said teeth are arranged in spiral formations on the exterior surface, said teeth extending radially, with respect to the second longitudinal axis, away from the exterior surface.

7. The cutting tool of claim 1 wherein the plurality of portions of the cylindrical cutter are mounted on bushings secured to the common drive shaft.

8. The cutting tool of claim 1 wherein the plurality of portions of the cylindrical cutter comprises at least four portions.

* * * * *